Oct. 6, 1936. T. A. BROWN 2,056,883
POLE HANDLING MECHANISM
Filed July 23, 1935 2 Sheets-Sheet 1
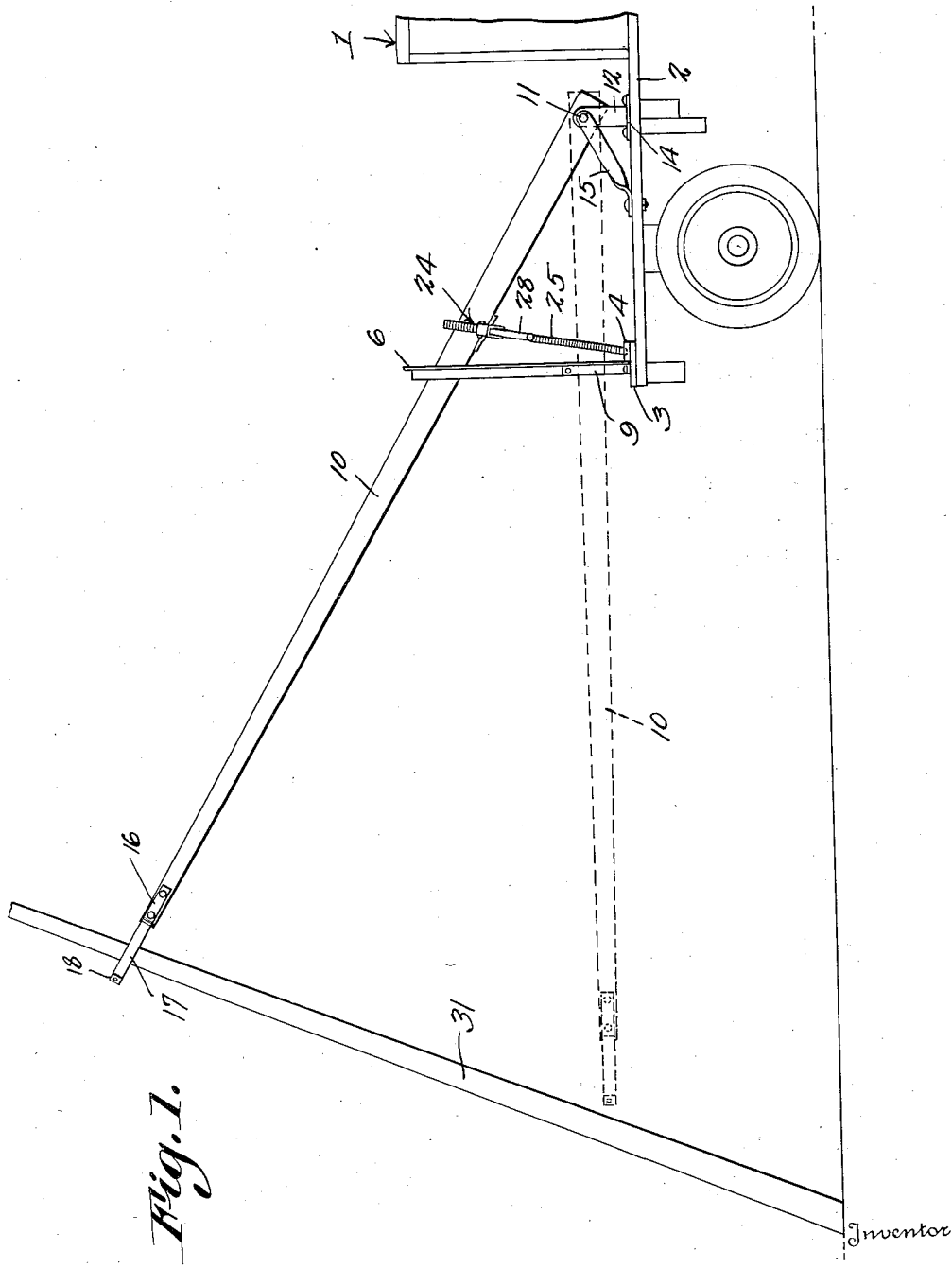
Inventor
T. A. Brown
By C. A. Snow & Co.
Attorneys.

Oct. 6, 1936.  T. A. BROWN  2,056,883
POLE HANDLING MECHANISM
Filed July 23, 1935  2 Sheets-Sheet 2
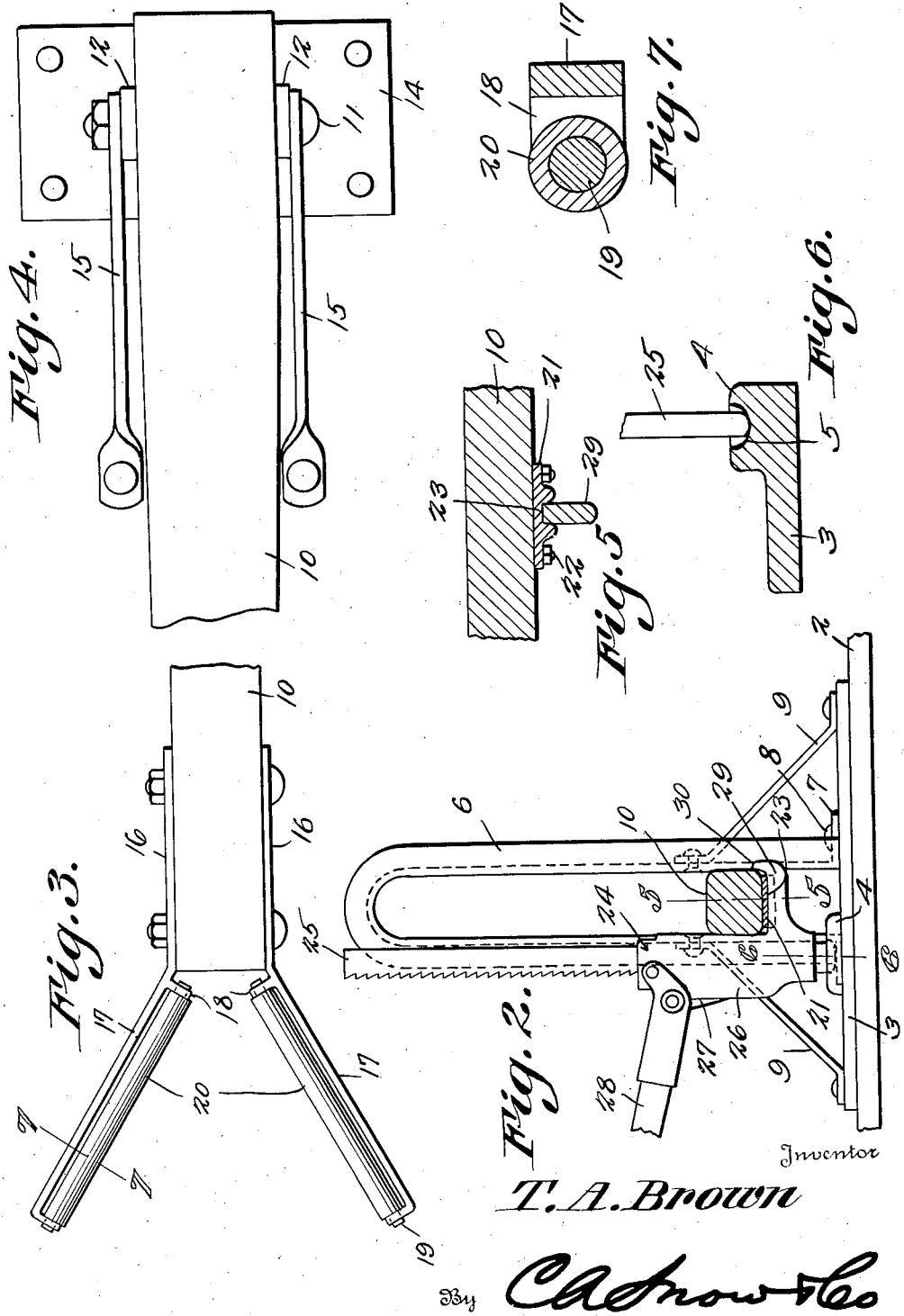
Inventor
T. A. Brown
By C A Snow & Co
Attorneys Patented Oct. 6, 1936

2,056,883

UNITED STATES PATENT OFFICE 2,056,883

POLE HANDLING MECHANISM

Thomas Armond Brown, Summerfield, Kans.

Application July 23, 1935, Serial No. 32,785

2 Claims. (Cl. 214—3)

This invention aims to provide a simple means whereby a single operator may raise a pole, such as a telegraph or telephone pole, and permit it to drop into a hole in the ground, prepared for its reception. The device comprises a vertically movable boom, and the invention aims to provide novel means for mounting the boom, for limiting the lateral movement of the boom, for raising the boom, and for permitting the boom to move without friction, with respect to the pole which is being raised.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a device constructed in accordance with the invention;

Fig. 2 is an elevation showing the boom guide, the jack, and attendant parts;

Fig. 3 is a plan view of the outer end of the boom;

Fig. 4 is a plan showing the pivotal mounting of the boom;

Fig. 5 is a section on the line 5—5 of Fig. 2;

Fig. 6 is a section on the line 6—6 of Fig. 2;

Fig. 7 is a cross section on the line 7—7 of Fig. 3.

In carrying out the invention, recourse is had to a support, which may be a wheel-mounted, motor-propelled vehicle 1, having a forwardly extended platform 2. On the forward end of the platform 2 is secured a base 3. The base 3 is supplied with an upstanding boss 4, provided with a socket 5 in its top.

The numeral 6 marks an inverted U-shaped guide, preferably made of an angle member, the guide 6 having outwardly extended feet 7 attached by securing elements 8 to the base 3. The boss 4 on the base 3 is located immediately behind one of the vertical side portions of the guide 6, as Fig. 2 will show. Downwardly diverging braces 9 have their upper ends secured to the side portions of the guide 6, the lower ends of the braces 9 being secured to the base 3.

A boom 10 is vertically movable in the guide 6. At its rear end, the boom 10 is mounted on a horizontal pivot element 11, such as a bolt, held in standards 12, projecting upwardly from a foot plate 14 secured to the platform 2, some distance behind the guide 6. Forwardly and downwardly inclined braces 15 have their rear or upper ends mounted on the pivot element 11, the lower, forward ends of the braces being secured to the platform.

Brackets 16 are secured to the sides of the boom 10, at the forward end thereof. The brackets 16 have forwardly presented, laterally diverging arms 17, provided with inwardly extended bearings 18, wherein are journaled the trunnions 19 of rollers 20 disposed parallel to the arms 17.

A wear plate 21 is attached by securing elements 22 to the boom 10, intermediate the ends of the boom, behind the guide 6, and nearer to the guide 6 than to the pivotal mounting 11 of the boom. The wear plate 21 is provided intermediate its ends with a seat 23 extended crosswise of the boom 10.

The numeral 24 designates a jack, which may be of any desired construction. As shown, but not of necessity, the jack comprises a standard 25, a carriage 26 movable longitudinally of the standard 25, and mechanism 27 for causing the carriage 26 to move longitudinally of the standard 25, said mechanism comprising a laterally extended lever 28, under the control of an operator. The lower end of the standard 25 is received in the socket 5 on the base 3. The carriage 26 has a laterally extended arm 29, received in the seat 23 of the wear plate 21 on the boom 10, the arm 29 having an upstanding projection 30 at its end, which, engaging the boom 10, as shown in Fig. 2, aids in holding the boom on the arm 29 of the carriage. The jack 24, it will be noted, is not permanently connected to the boom 10 or to the platform 2 and associated parts, although the jack has a firm hold on the boom, by way of the wear plate 21 and the seat 23, and on the base 3, by way of the boss 4 and the socket 5.

The operation of the device will be understood readily. Although a pole-setter is free to use the machine in accordance with his judgment and experience, and as dictated by the particular problem which confronts him, the device is of marked utility in setting a pole when there is a ditch between the highway and the hole in the ground, the hole being near to the ditch. Under such circumstances, it is hard to get a good foot hold about the hole, and set the pole by hand, and it is not feasible to run a vehicle equipped with block and falls or the like, up to the hole, because the ditch intervenes. The vehicle 1 can be left on the solid ground of the roadway, with the boom 10 extending across the ditch, and the pole 31 can be slid forwardly in the fork arms 17 (the boom 10 being in the dotted line position of Fig. 1), until the butt of the pole 31 is caught in the hole. The lever 28 is operated, the carriage 26 moves upwardly on the standard 25, and the pole is raised until it assumes a position near enough to the vertical so that it will drop down into the hole. The particular operation described may, however, be departed from without jeopardizing the utility of the invention. Friction is reduced, during the raising of the pole 31, by reason of the fact that the boom 10 is provided with the rollers 20, for engagement with the pole.

The device forming the subject matter of this application is simple in construction but it affords a simple yet effective means whereby a single person can raise a heavy pole to place.

Having thus described the invention, what is claimed is:

1. In a pole-handling mechanism, a vehicle, a base on the forward portion of the vehicle, a guide secured to the base, a boom vertically movable in the guide and provided at its outer end with means for retaining a pole against slipping laterally off said end of the boom, means for pivotally connecting the inner end of the boom to the vehicle, behind the guide, and a jack exerting an upward thrust on the boom and a downward thrust on the vehicle, the base having a socket in which the lower end of the jack is seated detachably but is guarded against slipping horizontally, the jack being located between the guide and the means for pivotally connecting the inner end of the boom to the vehicle.

2. In a pole-handling mechanism, a vehicle, a guide on the forward portion of the vehicle, a boom vertically movable in the guide and provided at its outer end with pole-engaging means, means for pivotally connecting the inner end of the boom to the vehicle, behind the guide, and a jack exerting an upward thrust on the boom and a downward thrust on the vehicle, the jack being located between the guide and the means for pivotally connecting the inner end of the boom to the vehicle, the pole-engaging means embodying forwardly diverging arms on the boom, and forwardly diverging rollers journaled on the arms.

THOMAS ARMOND BROWN.